(12) United States Patent
Chiu

(10) Patent No.: US 9,909,735 B2
(45) Date of Patent: Mar. 6, 2018

(54) LENS AND LIGHT-EMITTING DEVICE EMPLOYING SAME

(71) Applicant: HON HAI PRECISION INDUSTRY CO., LTD., New Taipei (TW)

(72) Inventor: Po-Chin Chiu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 259 days.

(21) Appl. No.: 14/922,857

(22) Filed: Oct. 26, 2015

(65) Prior Publication Data

US 2017/0059122 A1   Mar. 2, 2017

(30) Foreign Application Priority Data

Aug. 27, 2015  (TW) .................. 104128229

(51) Int. Cl.
*F21V 5/04*        (2006.01)
*G02B 19/00*       (2006.01)
*F21V 5/00*        (2018.01)
*F21V 7/00*        (2006.01)
*F21Y 115/10*      (2016.01)

(52) U.S. Cl.
CPC .............. *F21V 5/046* (2013.01); *F21V 5/002* (2013.01); *F21V 7/0091* (2013.01); *G02B 19/0009* (2013.01); *G02B 19/0061* (2013.01); *F21Y 2115/10* (2016.08)

(58) Field of Classification Search
CPC ........ F21V 5/046; F21V 5/002; F21V 7/0091; G02B 19/0009; G02B 19/0061
See application file for complete search history.

(56) References Cited

U.S. PATENT DOCUMENTS 8,870,409 B2 * 10/2014 Ye ........................... F21V 5/002
                                                          362/217.02
8,967,833 B2 *  3/2015 Wang ....................... F21V 5/04
                                                              359/708

* cited by examiner

*Primary Examiner* — Anabel Ton
(74) *Attorney, Agent, or Firm* — ScienBiziP, P.C.

(57) ABSTRACT

The present disclosure relates to a lens. The lens includes a bottom surface, a top surface, and a side surface. The top surface is opposite to the bottom surface. The center of the bottom surface is recessed towards the top surface to form a light incident groove. The top surface is recessed towards the bottom surface to form a light-emitting groove. The side surface is connected between the bottom surface and the top surface. The side surface defines a microstructure, and the side surface is fully covered by the microstructure.

10 Claims, 7 Drawing Sheets

US 9,909,735 B2

LENS AND LIGHT-EMITTING DEVICE EMPLOYING SAME

FIELD

The present disclosure relates to an optical lens and a light-emitting device employing the optical lens, particularly to an optical lens and a light-emitting device which can improve the uniformity of emergent ray.

BACKGROUND

Light emitting diode (LED) is a kind of optoelectronic semiconductor component which can convert current into light having a specific wavelength range. The light emitting diode is widely used as a light source for its high brightness, low voltage, low power consumption, easy matching with integrated circuits, simple drive, long life and other advantages. In order to make better use of light-emitting diodes, the light emitting diode is usually coated with a surrounding lens for secondary optical correction after encapsulation.

Light from the LED emits externally from top and side surfaces of the lens.

BRIEF DESCRIPTION OF THE DRAWINGS

Implementations of the present technology will now be described, by way of example only, with reference to the attached figures, wherein.

DETAILED DESCRIPTION

Figure 1:
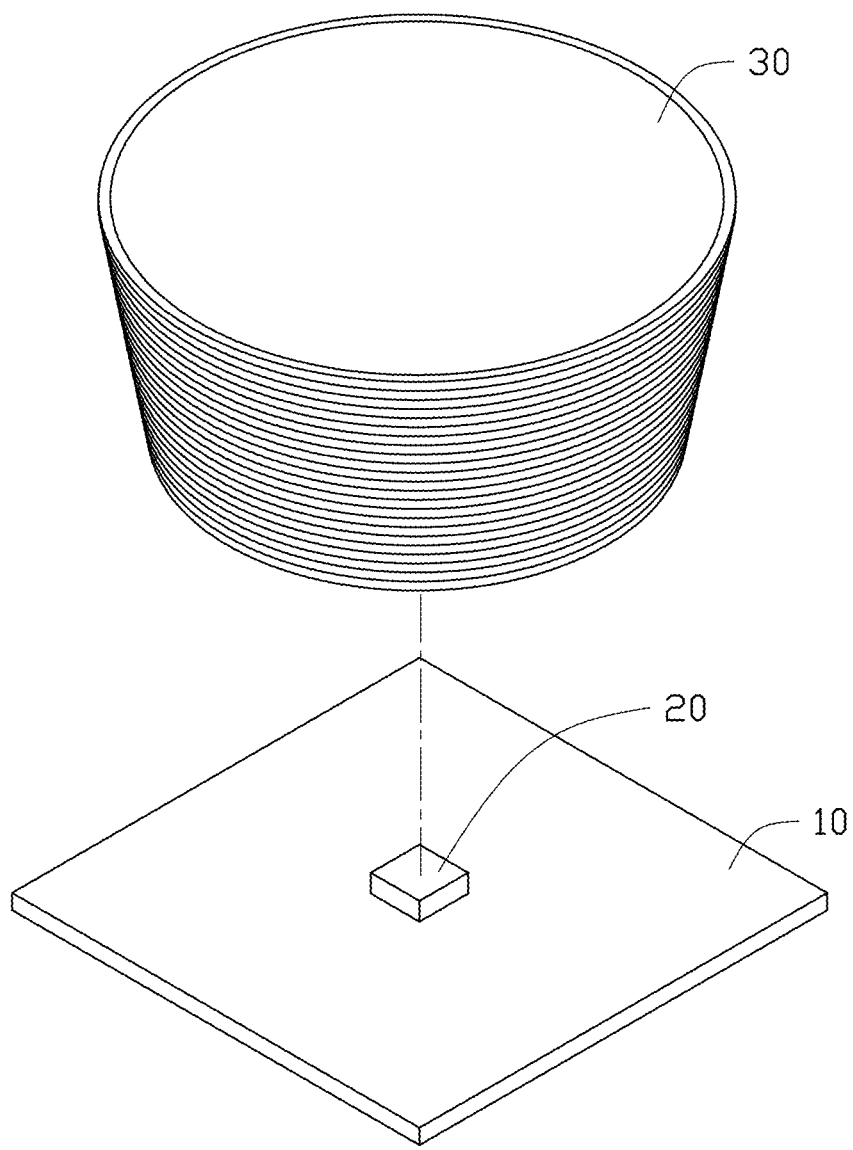
FIG. 1 is an exploded view of a light-emitting device, according to an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates a light-emitting device 100 according to an embodiment.

The light-emitting device 100 includes a substrate 10, a LED light source 20, and a lens 30. The LED light source 20 is covered by the lens 30.

The substrate 10 can be a copper coated laminate, a printed circuit board, etc. In at least one embodiment, the substrate 10 is a printed circuit board. The substrate 10 can be a cube or a cone.

The LED light source 20 is set on the substrate 10. The LED light source 20 is packaged on the substrate 10 by flip chip technology. In at least one embodiment, the LED light source 20 is a cube. One side of the LED light source 20 is adhered on the substrate 10, and electrically connected to the substrate 10. The other five sides of the LED light source 20 can emit light, or only the top side of the LED light source 20 can emit light. In at least one embodiment, the LED light source 20 only emits light from the top side. In other embodiments, the LED light source 20 can be a cone or other shapes.

Figure 2:
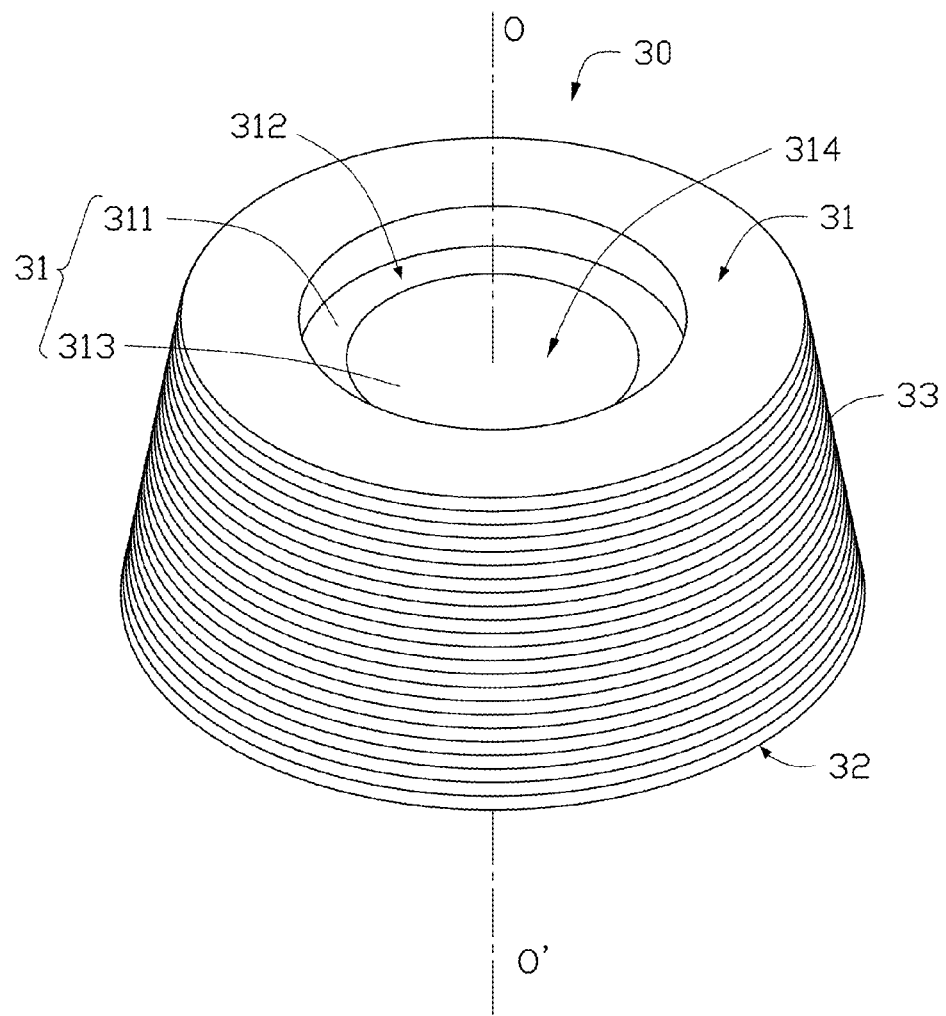
FIG. 2 is an isometric view of a lens of the light-emitting device of FIG. 1.

FIG. 2 illustrates a lens 30 that includes a bottom surface 31, a top surface 32 and a side surface 33. The side surface 33 is connected between the bottom surface 31 and the top surface 32. In at least one embodiment, the lens 30 has an optical axis OO', and the lens 30 is symmetric about the optical axis OO'. The material of the lens 30 can be selected from the group comprising polycarbonate, polymethyl methacrylate and glass. The LED light source 20 is set on the optical axis OO' of the lens 30.

Figure 4:
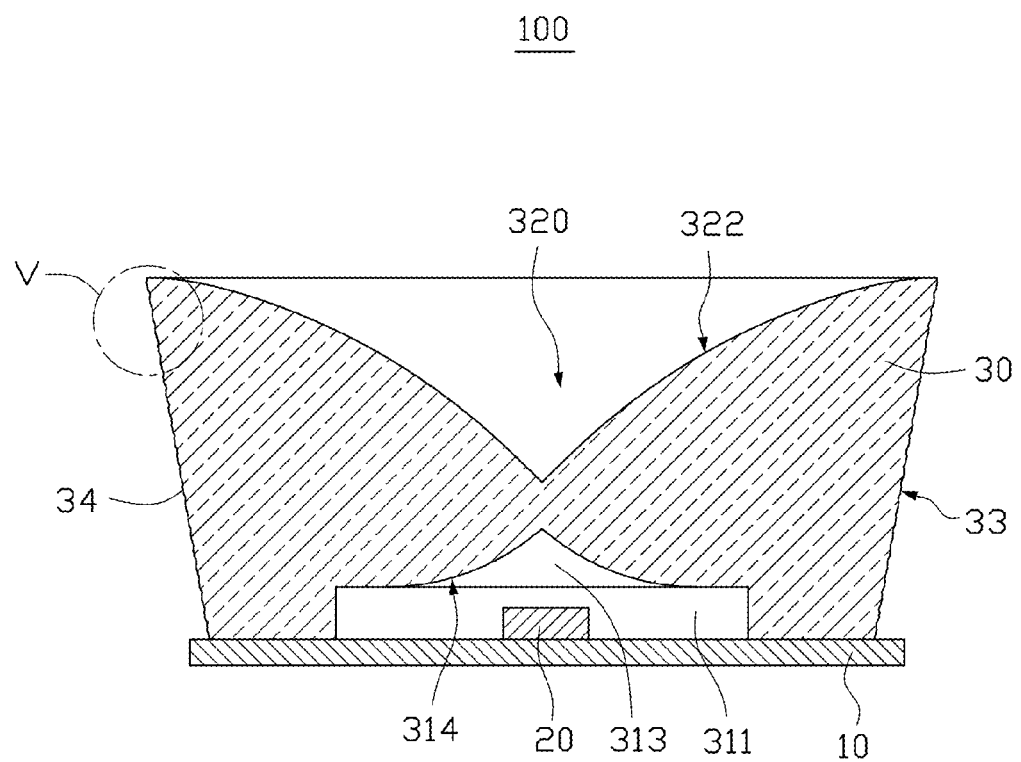
FIG. 4 is a cross-sectional view taken along IV-IV line of FIG. 3.

The bottom surface 31 is set on the substrate 10. In detail, the bottom surface 31 is a plane. The center of the bottom surface 31 is recessed towards the top surface 32, and forms a light incident groove 310. The light incident groove 310 includes a first groove 311 and a second groove 313. The second groove 313 is defined on a bottom 312 of the first groove 311. The bottom 312 is parallel to the bottom surface 31. The first groove is a cylinder. FIG. 2 and FIG. 4 illustrate the second groove 313 is an inverted V-shaped groove whose bottom 314 is a smooth curved surface. A radius of the curved surface is away from the bottom surface 31.

Figure 3:
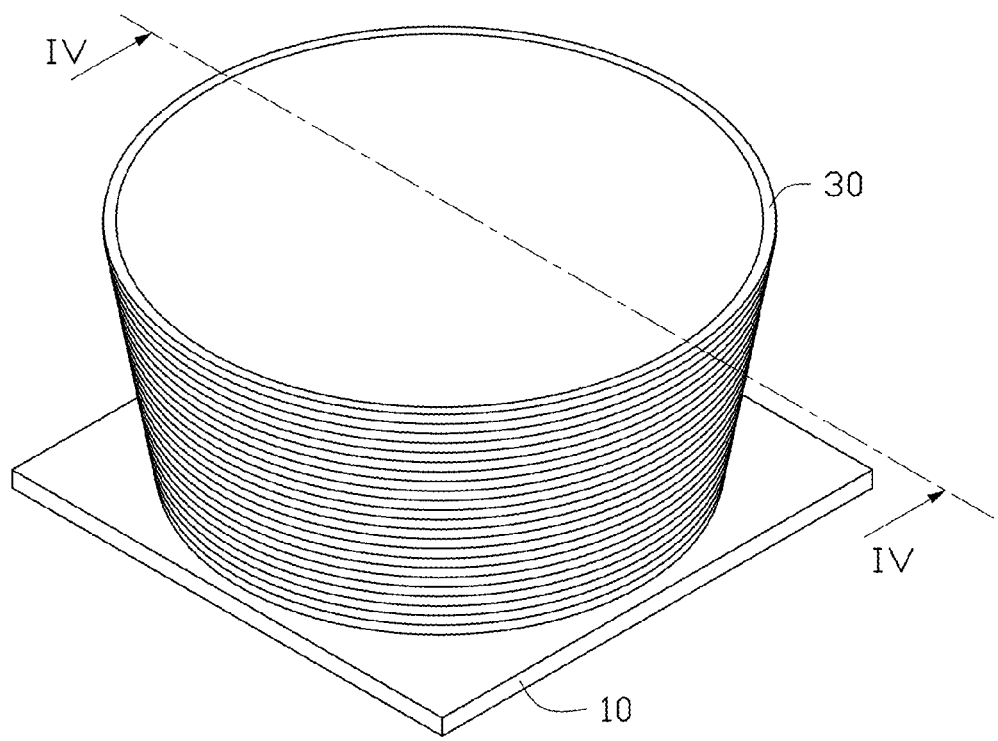
FIG. 3 is an isometric view of the light-emitting device of FIG. 1.

FIG. 3 and FIG. 4 illustrate the top surface 32 is opposite to the bottom surface 31. The top surface 32 is recessed towards the bottom surface 31 to form a light-emitting groove 320. The light-emitting groove 320 is a V-shaped groove whose bottom 322 is a smooth curved surface. A radius of the bottom 322 is away from the top surface 32. The bottom 322 is opposite to the bottom 314. An area of the bottom 322 is larger than an area of the bottom 314.

Figure 5:
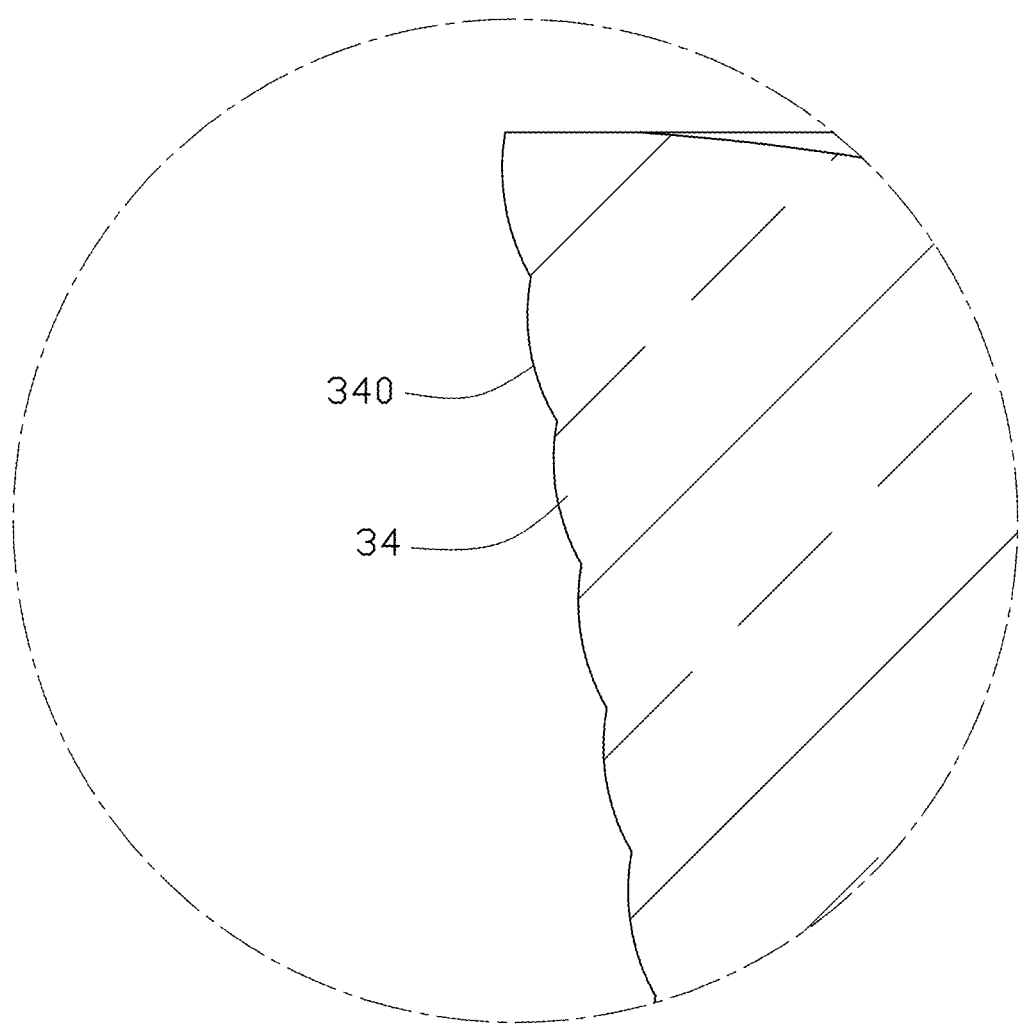
FIG. 5 is an enlarged view of a circled V part of FIG. 4.

The side surface 33 connects to the bottom surface 31 and the top surface 32; the side surface 33 is between the bottom surface 31 and the top surface 32. The side surface 33 is a ring-shaped surface. The side surface 33 is opposite to a ring-shaped surface of the first groove 311. An area of the side surface 33 is larger than an area of the ring-shaped surface of the first groove 311. The side surface 33 is slanted to the optical axis OO'. FIG. 5 illustrates the side surface 33 defines a microstructure 34. The side surface 33 is completely covered by the microstructure 34. The microstructure 34 can be a spiral bulge 340 which surrounds the side surface 33. The microstructure 34 also can be composed of a plurality of annular bulges 340 which are equally arranged. In order to improve the brightness and diffusion uniformity of flare which emits from the side surface 33, radius of curvature of the spiral bulge 340 or the annular bulges 340 are between 0.4 millimeters and 0.7 millimeters. If the radius of curvature is less than 0.3 millimeters, the flare intensity which spreads to a peripheral increases, and the flare intensity of center darkens. If the radius of curvature is more than 0.7 millimeters, the microstructure 34 will get flatter, which has no promotion of brightness and diffusion uniformity. In at least one embodiment, the microstructure 34 is composed of a plurality of annular bulges 340 which are equally arranged. A distance between centers of adjacent annular bulges 340 is less than 0.3 millimeters; the amount of layers of the microstructure 34 is increased to influence the processing time and precision.

FIGS. 1-3 illustrate when in assembly, the LED light source 20 is packaged and positioned on the center of the substrate 10, the optical axis OO' of the lens 30 is aligned with the LED light source 20, the lens 30 is fixed on the substrate 10 by adhesive, at the same time, the LED light source 20 is covered by the light incident groove 310, the light incident groove 310 is right above of the LED light source 20, the light incident groove 310 and the substrate 10 together constitute a confined space 40. The LED light source 20 is placed in the confined space 40.

When the light-emitting device 100 operates, the light of the LED light source 20 enters the lens 30 through the bottom 314 of the second groove 313. Part of light irradiates on the bottom 322 of the light-emitting groove 320, and then is reflected to the side surface 33 or refracted to external environment by the bottom 322. Part of the light emits externally from the side surface 33 directly after entering the lens 30. Due to the microstructure 34 of the side surface 33 is composed of a plurality of annular bulges 340 which are equally arranged, the light transmission will be in more directions, after the light enters the lens 30. Hence, the light which emits from the LED light source 20 and is refracted by the side surface 33 presents an improved uniformity.

Figure 6:
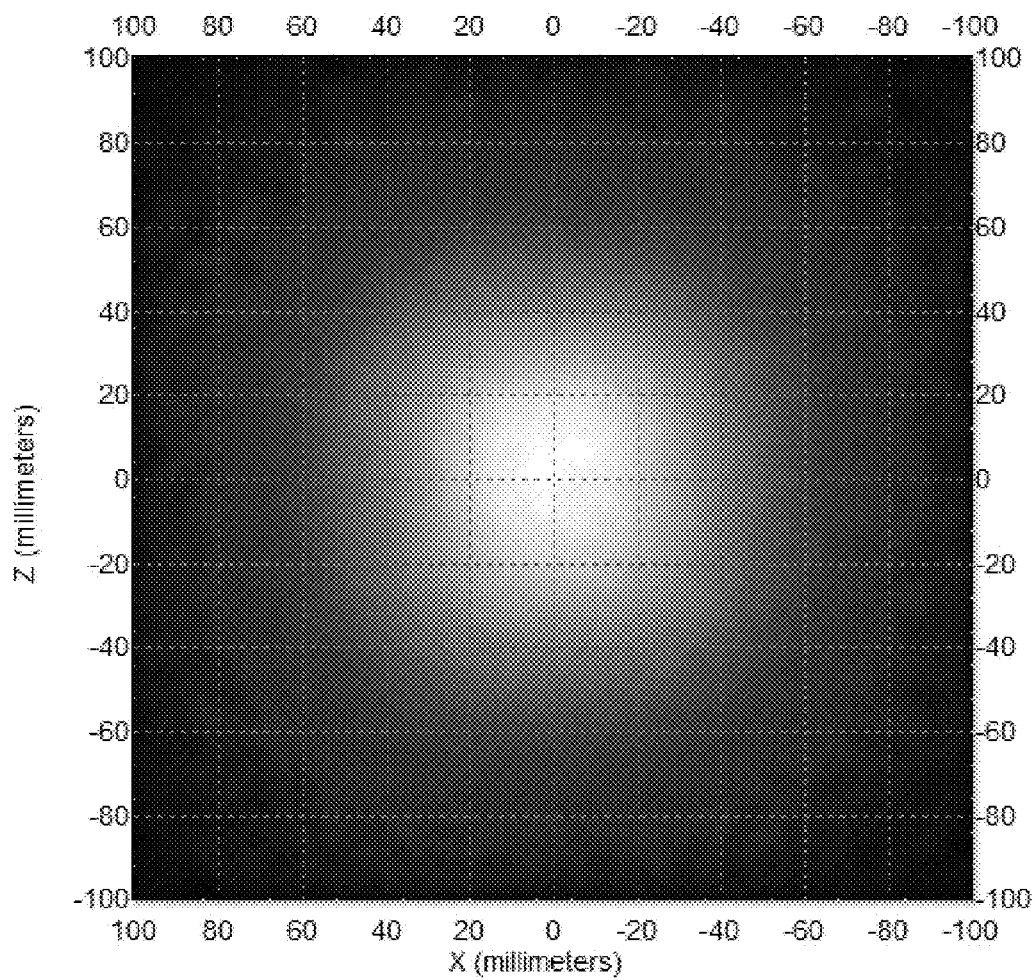
FIG. 6 is an effect view of the flare of light emitted from a side surface of a conventional light-emitting device.

FIG. 6 illustrates the peripheral light of the overall flare, which emits from the side surface 33, is large, and is uneven, when the side surface 33 does not define the microstructure 34.

Figure 7:
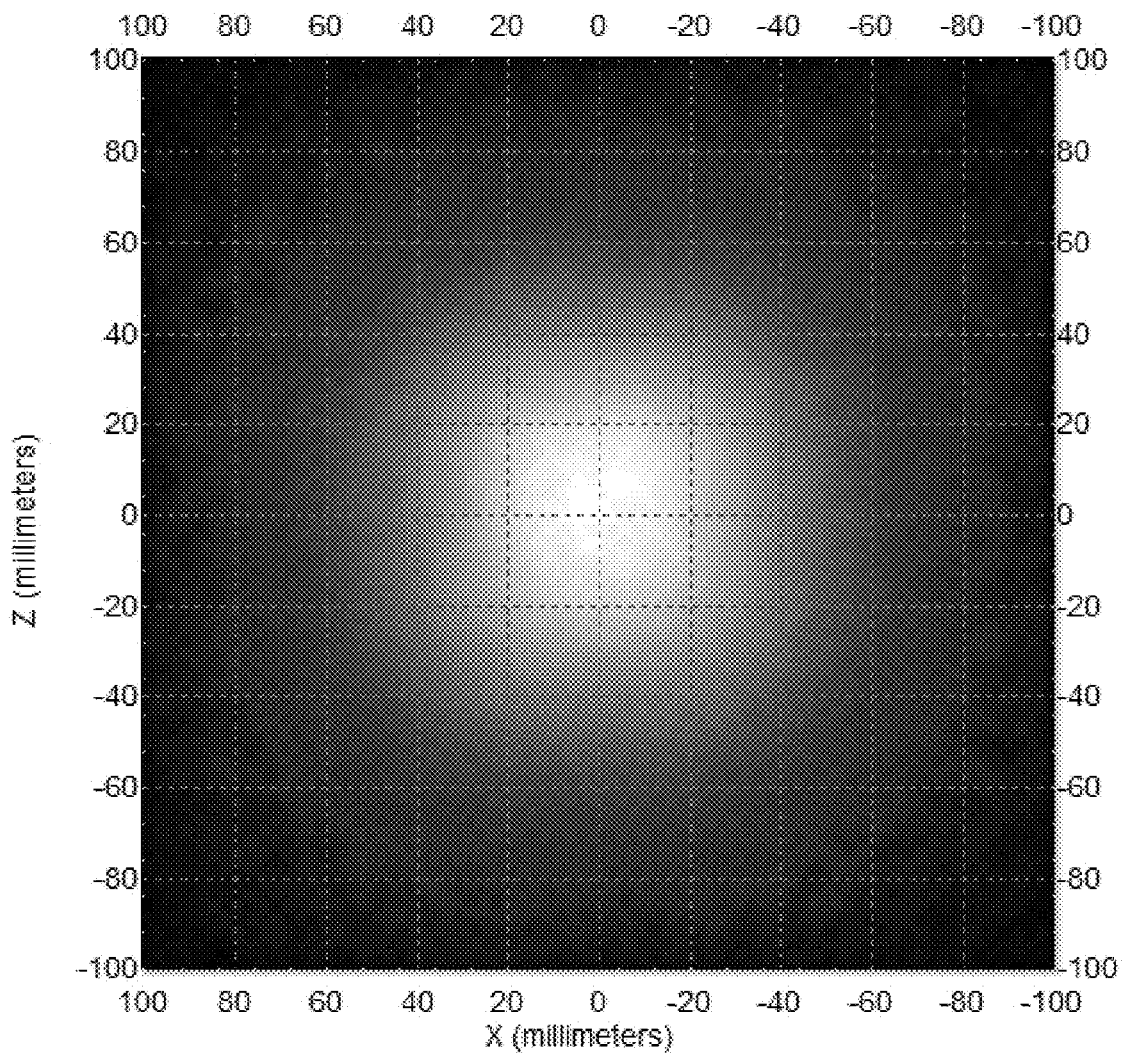
FIG. 7 is an effect view of the flare of light emitted from a side surface of the light-emitting device of FIG. 1.

FIG. 7 illustrates the overall flare, which emits from the side surface 33, is diffused, the scope of the peripheral light of the overall flare is small, and the overall uniformity of the flare improves, when the side surface 33 defines the microstructure 34.

Due to the side surface 33 of the light-emitting device 100 defining the microstructure 34, when the lens 30 is matched with the LED light source 20, light transmission directions improve, the light of the LED light source 20 emitting through the microstructure 34 will present an improved uniformity after the light of the LED light source 20 enters the lens 30 as compared to traditional implementations. The diffusion of the overall flare which emits from the side surface 33, strengthens and leads to the scope of the peripheral light of the flare light decreasing, the overall uniformity of the flare improves the range of the flare increases.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A lens comprising:
    a bottom surface having a center;
    a top surface opposite to the bottom surface; and
    a side surface connected between the bottom surface and the top surface, the side surface defining a microstructure and being fully covered by the microstructure, wherein the center of the bottom surface is curved towards the top surface to form a light incident groove, the top surface is curved towards the bottom surface to form a light-emitting grooves, the microstructure is composed of a plurality of annular bulges which are equally arranged.

2. The lens of claim 1, wherein a distance between centers of adjacent annular bulges is more than 0.3 millimeters.

3. The lens of claim 1, wherein radius of curvature of the annular bulges are between 0.4 millimeters and 0.7 millimeters.

4. The lens of claim 1, wherein the microstructure is a spiral bulge which surrounds the side surface.

5. The lens of claim 4, wherein radius of curvature of the spiral bulge is between 0.4 millimeters and 0.7 millimeters.

6. A light-emitting device, the light-emitting device comprising:
    a lens, the lens comprising:
    a bottom surface;
    a top surface, wherein the top surface is opposite to the bottom surface, the center of the bottom surface is sagged towards the top surface to form a light incident groove, the top surface is sagged towards the bottom surface to form a light-emitting groove; and
    a side surface connected between the bottom surface and the top surface, the side surface defining a microstructure, and the side surface being fully covered by the microstructure; and
    a light source, wherein the light source is covered by the lens, the microstructure is composed of a plurality of annular bulges which are equally arranged.

7. The light-emitting device of claim 6, further comprising a substrate, wherein the substrate is placed under the lens, and the light source is set on the substrate.

8. The light-emitting device of claim 6, wherein part of the light emitted by the light source is reflected by the top surface, then emits externally evenly through the side surface.

9. The light-emitting device of claim 6, wherein the part of light of the light source emits externally through the side surface directly after entering the lens.

10. The light-emitting device of claim 6, wherein the light source is a light emitting diode (LED).

\* \* \* \* \*